Patented May 16, 1939

2,158,392

UNITED STATES PATENT OFFICE 2,158,392

BREAD AND BAKERY PRODUCT

Roger W. Ament, Inglewood, Calif., assignor to Kelco Company, Los Angeles, Calif., a corporation of Delaware No Drawing. Application August 19, 1935, Serial No. 36,905

15 Claims. (Cl. 99—90)

This invention relates to bakery products and its object is to improve bread and other products made from flour in commercial bakeries. To impart a clear understanding of the invention to those skilled in the art I will explain the same as regards the making of bread; but it is also applicable to other bakery products as hereinafter stated. The essentials of the invention for which protection is desired are summarized in the appended claims.

For bread making, flours having a high content of high quality gluten are superior, because certain desirable characterics of the dough and of the finished bread are definitely related to the gluten quality and the gluten content, the most important qualities in this respect being water absorption, eating quality, tolerance, oven-spring, external appearance of the loaf, and keeping quality of the loaf.

By "absorption" I mean the ability of the flour to take up water to produce a dough possessing the requisite dryness and workability. A dough made from 63 pounds of water and 100 pounds of high quality flour, as an example, will be quite satisfactory and will not become sticky during the period of fermentation and rising. On the other hand, another dough of like composition but made from low quality flour may be so sticky that it cannot be easily handled. Therefore in general the higher the flour quality the greater absorption of moisture in the dough and the better the bread. But addition of water must not be carried too far, otherwise the ultimate loaf would have an open grain and tend to contract after baking.

By "eating quality" I mean those properties which bring out the wheat and milk flavor in the loaf and also produce a soft bread which can be chewed without becoming doughy or soggy or sticking to the teeth.

By "tolerance" I mean ability of the dough to withstand variations in time, temperature and methods of handling during the process of bread making. For example, if the dough or sponge is punched down or divided into loaves too soon, the finished loaf will not possess optimum volume nor the desired aroma; whereas if the dough or sponge is not punched or divided soon enough, the crust will not brown well, due to loss of sugar through fermentation, and the loaf will have an undesirable "acid" aroma, and will not possess the optimum volume. Experienced bread makers know that the dough or sponge must be punched down or divided at the proper time in order to obtain the best results, and that the proper time interval is not very long, usually some five or ten minutes out of about three hours in the straight-dough process, and a still shorter interval if a so-called "bread improver" is used. The purpose of such "improver" is usually to increase the rate of fermentation and therefore the tolerance time becomes more critical when it is present.

"Oven-spring" means the expansion of the dough at the beginning of the baking period.

The "external appearance" of the loaf is related to the gluten content in a characteristic manner easily recognized by those who are familiar with baking. In breads from high gluten flours the air bubbles on the bottom surface look as if they had been opposed during expansion by a contracting force which tended to preserve their spherical shape; and the sides of the loaf have a characteristic stringy appearance which is absent in low-gluten flours. These effects seem to be due to the fact that gluten imparts toughness to the dough and this toughness produces a greater resistance to expansion in the higher gluten doughs. The internal appearance of the loaf is concerned mainly with grain, crumbling, texture, aroma and taste. Other things being equal a high quality gluten flour is superior to a low quality gluten flour, for the loaf when cut has a better texture in that it is firm, velvety, soft and elastic and has a uniformly fine air-cell structure; and also is lighter in color, has less tendency to crumble, and a more pleasing odor.

The "keeping quality" of a high quality gluten bread is superior to a low quality gluten bread. It retains its high quality texture, aroma and taste and also its softness to touch for a longer period of time.

I have discovered that a soluble edible alginate, such as sodium or ammonium alginate, is valuable in bread making in that it can be used to supplement or aid the gluten and will enhance all the aforesaid desirable qualities.

I have found that the addition of a small amount of edible alginate (such as sodium alginate) to the dough produces noticeable effects. The addition of one-tenth ($\frac{1}{10}$) of one percent of the alginate to flour, by weight, renders the dough noticeably tougher and less sticky. The effect is more pronounced if the quantity of alginate is increased or if an alginate of high viscosity is used. For example, one half ($\frac{1}{2}$) of one percent of high viscosity alginate produces a very tough dough.

Because of this increased toughness and decreased stickiness of the dough, more water can be added than is normally possible and still the dough will work well and not be sticky; as compared with a like dough not containing alginate. The advantage of increasing the absorption (i. e., adding more water) lies in obtaining a more moist loaf and an increased bread yield, an evener oven-spring, better texture and grain, and the palatibility is enhanced, and sogginess lessened. Thus, not only is the quality of the final bread improved through increase in the water content, but the quantity is raised also. This property of increasing the absorption is one most valuable result obtained by using alginates in bread making.

Preferably I employ a water soluble edible alginate salt, such as ammonium alginate, or sodium alginate, produced by the process described in Walsh and Thornley Patent No. 1,814,981, or by the methods disclosed in the Clark and Green application (case 8032) Serial No. 693,891, filed October 16, 1933; or the Green application (case 8102) Serial No. 721,829, filed April 21, 1934. Other water soluble edible alginates may be employed.

In some cases the alginates may contain dextrin or sugar which render the product more readily soluble, as described in application of Howard J. Lucas, filed July 2, 1934, Serial No. 733,530.

In some cases the alginates may also contain some salt which will react with a soluble calcium salt to form an insoluble calcium salt so that the alginate will go into solution as described in the Wig U. S. Patent No. 2,000,807. An example of which is an ammonium alginate paste containing 10% ammonium alginate, 3% sugar, and 1% trisodium phosphate dried, and ground to pass through an 80 mesh screen.

The alginates above referred to may be dried and ground and then mixed with starch or flour, so that when added to water and mixed with flour and starch will keep the alginate particles separated long enough to permit them to go into solution and not to form lumps.

The alginates above described may also be mixed with water and yeast to act as a binder and preserver of the yeast and also as a bread improver.

The amount of ammonium alginate I have used (as manufactured by the Clark-Green application) has been varied from 0.10% to 1.0% of the flour, by weight, and it has been found possible to increase the amount of absorption by 2.5% to 35% respectively. The latter increase in absorption is much greater than can be brought about by the addition of any other substance including gluten. Still greater absorption can be obtained by the use of a larger percentage of alginate.

Bread made with alginate, even when containing additional water, has definitely better eating qualities. I have made many batches of bread identical in formula and baking procedure except some contained alginates and the above mentioned extra amount of water. The breads containing alginates were soft and could be chewed without becoming doughy and sticky in the mouth. This property is important because such improvement is what bakers have been trying to obtain.

Another valuable influence of alginate is the effect upon tolerance. I have found that in many cases the tolerance at the end of the first rise can be increased to twenty-five or thirty minutes with a three hour straight dough; that is the dough may be punched down or divided at about twelve to fifteen minutes longer or shorter than the usual time required in the absence of alginate; and the quality of the loaf is unharmed. When the alginate is not used the longer fermentation period would result in a loaf of poor quality. Even an increase in the gluten content, or the use of a higher quality flour, does not influence the tolerance to the extent which alginate does. Compared with a non-alginate dough, an alginate dough possesses greater tolerance towards variations in time, temperature and methods of handling throughout the process, viz., mixing, sponge-time or first rise, punching, second rise, scaling, rounding, proofing, molding, pan-proofing, and baking.

The use of alginate also betters the oven-spring and the appearance of the outside of the loaf, even though more water has been added to the dough. Breads made from flour of low gluten content but containing alginate, are equal to breads made from flour of high gluten content.

The texture of the bread and the keeping quality of the bread are also improved by the alginate, as the alginate bread has a better texture and higher moisture content, and will remain in a better state of preservation with respect to texture, moisture and softness after a given period of time. The improvement in texture and in keeping quality are further important effects of the alginate.

The alginate has no deleterious effect upon the fermentation process or the dough processing operation or baking operation, and results in greater loaf volume than can be obtained without it and also a deeper crust coloring in dark breads.

It will be evident from the foregoing that alginate is highly useful in bread making, because it contributes to the flour many of the desirable properties of gluten, and therefore imparts to bread made of low percentage gluten flour the qualities which are characteristic of high gluten breads. In addition the alginates contribute certain characteristics not obtainable even with highest quality flour, such as superior chewing qualities and high ratio of water absorption. Alginates in bread will absorb up to 26 times their weight of water while the best flour will absorb about $\tfrac{7}{10}$ its own weight.

One example of the manner in which sodium alginate may be used in bread making is as follows: To seventy-four (74) pounds of water add one-half (½) pound of fairly fine (50–100 mesh) sodium alginate, and stir the mixture for a few minutes until the alginate is well dissolved. Then add four (4) pounds of sugar, four (4) pounds of skim milk powder, four (4) pounds of fat, two (2) pounds of salt, two (2) pounds of yeast and one hundred (100) pounds of white flour and mix for several minutes. Allow the dough to rise in the usual manner for about three hours, then punch down, and allow it to rise a second time; then make into loaves, place in the pans, allow loaves to pan proof, and finally bake. It will be noted that the use of the alginate does not necessitate any modification of the usual procedure which the baker is accustomed to follow.

Variations in the procedure given above may be made in the relative amounts, in the order of mixing, or in the process used whether it be sponge-dough or straight-dough. However, it is preferable to add the alginate to the water before any of the flour is added. The flour may be added all at once or in two portions, a part at the beginning of mixing and the rest later. The sodium alginate need not be finely divided, but unless it is it does not dissolve as readily; and if quite coarse it should be soaked in water for several hours, or be stirred in water for longer than a few minutes. In order to prevent the formation of lumps when adding to water, the sodium alginate, in the dry state, may be mixed with all of or a part of the sugar and/or the salt used.

Sodium alginate does not alter the fermentation process nor does it adversely affect the appearance of the loaf, the aroma or the taste. Because of the lack of deleterious effects, sodium alginate is superior to the usual "bread improver".

When the sponge-dough process is used the alginate may be incorporated with the sponge, or with the dough; or part may be incorporated with the sponge and part with the dough. Usually best results are obtained if the alginate is all incorporated with the sponge.

Instead of sodium alginate, ammonium alginate, potassium alginate or other soluble, edible salts of alginic acid may be used. If desired an alginate product may be used by drying down a pasty mixture of one of these alginates, water and sugar, as described in Patent to R. J. Wig. No. 2,000,807, dated May 7, 1935.

I have found a mixture of 75% ammonium alginate (dry basis) and 25% sugar (mixed wet), dried and ground through 80 mesh; and then blended with an equal weight of flour will readily disperse without lumping in a dough mixer.

A mixture made from ammonium (or other soluble alginate salt) dried from a paste form which contained from .5% to 1% trisodium phosphate or equivalent salt capable of reacting with a soluble calcium salt to form an insoluble calcium salt (as set forth in application Case No. 8120 of Howard J. Lucas, Serial No. 733,530 filed July 2, 1934) increases the solubility of the alginate in the dough. The advantage of using one of these dried mixtures lies in the greater ease of solution.

Many bakers use so-called "bread-improvers" whose function generally is to hasten the fermentation process, increase the oven-spring or increase the workability. Usually such a substance has a deleterious effect upon some other property, such as appearance of the loaf, aroma or taste.

The increased water absorption may be realized either by an actual increase in the amount of water in the dough, or by adding less water than the alginate would take and thereby obtaining a drier more workable dough. There is no substance now being used in bread making which gives anywhere near the absorption increase produced by alginates, particularly the high viscosity alginates as prepared by the aforesaid Clark-Green application.

Some "improvers" give increased absorption but no increase in oven-spring while others (such as "yeast foods") increase spring but have no effect on the water absorption. There are some materials (such as Suredough and starch and potato flours) which increase the absorption and keeping qualities but do not increase the oven-spring.

The oven-spring is increased by sealing the interstices between the starch particles and gluten fibers so that the gas formed by fermentation and heat may blow up the loaf. This is in direct contrast with so-called "yeast foods" (usually calcium or aluminum salts), which retard the action of the yeast prior to entering the oven, so that more yeast will be present in the oven to generate gas at a faster rate to give oven-spring.

By the use of the alginate better keeping qualities are obtained by sealing the bread pores, and also by the extra amount of water present.

Reduction of gumminess has been more or less obtained heretofore by careful and correct aging of the dough as well as careful control of other factors; but alginates give this absence of gumminess with less careful handling; and it is usually impractical for bakeries to accurately control the aging time.

All of these aforesaid improvements are obtained by the use of alginates.

Sodium alginate, or other soluble edible salt of alginic acid, may be used in bakery products other than white bread. It is valuable in breads made of whole-wheat flour, or of mixtures of whole-wheat and white flour; also of rye flour, or mixtures of rye and wheat flours. The proportion of sodium alginate to be used varies with the composition of the flour mixture and with the desired result. Sodium alginate will improve the quality of bakery products containing bran, corn-meal, or any flours or meals used in different kinds of bakery products.

I claim:

1. Bread containing an edible soluble alginate mixed with the usual bread-making ingredients.
2. Bakery products containing a soluble edible alginate.
3. Bread dough containing the usual bread-making components and an edible soluble alginate whereby the dryness and workability of the dough is enhanced.
4. Bread containing an edible soluble ammonium alginate mixed with the usual bread-making ingredients.
5. Bakery products containing a soluble edible high viscosity ammonium alginate.
6. Bakery products containing a soluble edible high viscosity ammonium alginate containing trisodium phosphate.
7. Bread containing an edible soluble sodium alginate mixed with the usual break-making ingredients.
8. Bakery products containing a soluble edible sodium alginate.
9. Bread containing an edible soluble potassium alginate mixed with the usual bread-making ingredients.
10. Bakery products containing a soluble edible potassium alginate.
11. Bread and bakery products containing a soluble edible alginate in the approximate proportion of from one-tenth of one percent to one percent of the weight of the flour used therein.
12. Bread and bakery products containing an edible soluble alginate in the approximate proportion of from one-fourth percent to one-half percent by weight of the flour used therein.
13. In the art of making bread and bakery products, adding an edible soluble alginate to the water component of bread, dissolving the alginate, then adding the other ingredients used in making the product and working the mixture into a dough, and finally baking the dough.
14. In the art of making bread and bakery products, adding a soluble edible alginate to water and flour, mixing same, then adding the other desired ingredients used in making the product and working the mixture into a dough, and finally baking the dough.
15. In the art of making bread and bakery products, adding a soluble ammonium alginate to water and flour, mixing same, then adding the other ingredients used in making the product and working the mixture into a dough, and then baking the dough.

ROGER W. AMENT.